US007296720B2

(12) United States Patent
Kirby et al.

(10) Patent No.: US 7,296,720 B2
(45) Date of Patent: Nov. 20, 2007

(54) LOW STAPLE INDICATOR FOR A STAPLER

(75) Inventors: David Kirby, Lemont, IL (US); Andrew Kist, Palatine, IL (US); Bikramjeet S. Sohi, Buffalo Grove, IL (US); Roland Sudmalis, Chicago, IL (US)

(73) Assignee: ACCO Brands USA LLC, Lincolnshire, IL (US)

( * ) Notice: Subject to any disclaimer, the term of this patent is extended or adjusted under 35 U.S.C. 154(b) by 131 days.

(21) Appl. No.: 11/187,628

(22) Filed: Jul. 22, 2005

(65) Prior Publication Data

US 2006/0016847 A1 Jan. 26, 2006

Related U.S. Application Data

(60) Provisional application No. 60/590,657, filed on Jul. 23, 2004.

(51) Int. Cl.
*B25C 5/02* (2006.01)
*G01D 13/00* (2006.01)

(52) U.S. Cl. .......................... 227/120; 227/8; 227/135; 116/201

(58) Field of Classification Search .................... 227/8, 227/110, 107, 120, 135, 136; 116/201, 208, 116/284

See application file for complete search history.

(56) References Cited

U.S. PATENT DOCUMENTS

| | | | | |
|---|---|---|---|---|
| 4,406,392 | A | | 9/1983 | Campbell et al. |
| 4,506,819 | A | | 3/1985 | Rand |
| 4,523,707 | A | | 6/1985 | Blake, III et al. |
| 4,558,810 | A | | 12/1985 | Mulhauser et al. |
| 4,591,086 | A | | 5/1986 | Campbell et al. |
| 4,645,111 | A | | 2/1987 | Larrabee et al. |
| 4,664,305 | A | | 5/1987 | Blake, III |
| 4,714,187 | A | | 12/1987 | Green |
| 4,715,522 | A | * | 12/1987 | Jordan ........................ 227/156 |
| 4,925,082 | A | | 5/1990 | Kim |
| 4,951,860 | A | | 8/1990 | Peters et al. |
| 5,062,563 | A | | 11/1991 | Green et al. |
| 5,219,111 | A | | 6/1993 | Bilotti et al. |
| 5,364,002 | A | | 11/1994 | Green et al. |
| 5,427,298 | A | | 6/1995 | Tegtmeier |
| 5,441,191 | A | | 8/1995 | Linden |
| 5,507,425 | A | | 4/1996 | Ziglioli |
| 5,992,724 | A | | 11/1999 | Snyder |
| D424,898 | S | | 5/2000 | Wilson |
| 6,209,772 | B1 | | 4/2001 | Wang |
| 6,267,284 | B1 | | 7/2001 | Clark |
| 6,601,748 | B1 | | 8/2003 | Fung et al. |
| 2002/0117531 | A1 | * | 8/2002 | Schell et al. ................... 227/8 |
| 2003/0155398 | A1 | * | 8/2003 | Jairam et al. ............... 227/109 |

* cited by examiner

OTHER PUBLICATIONS

International Search Report and Written Opinion issued on Oct. 3, 2006 for corresponding International Application No. PCT/US2005/26042.

*Primary Examiner*—Rinaldi I. Rada
*Assistant Examiner*—Paul Durand
(74) *Attorney, Agent, or Firm*—Michael Best & Friedrich LLP

(57) ABSTRACT

A stapler includes a base, a staple storage chamber coupled with the base, a staple pusher assembly positioned at least partially in the staple storage chamber, and a low staple indicator distinct from the staple pusher assembly and movable between a first position indicating the presence of a staple at a location in the staple storage chamber and a second position indicating the absence of a staple at the location in the storage chamber.

19 Claims, 9 Drawing Sheets

LOW STAPLE INDICATOR FOR A STAPLER

RELATED APPLICATIONS

This application claims priority to U.S. Provisional Patent Application No. 60/590,657 filed on Jul. 23, 2004, the entire contents of which are hereby incorporated by reference.

FIELD OF THE INVENTION

The invention relates to staplers, and more specifically to low staple indicators for staplers.

BACKGROUND OF THE INVENTION

It is known to incorporate low staple indicators on both manual and electric staplers. These indicators come in various forms and are intended to provide visual notification to a user when the number of staples remaining in the stapler is getting low. Most typically, these indicators are part of the staple pusher assembly, either as part of the pusher itself or as part of the spring that biases the pusher toward the front of the magazine.

SUMMARY OF THE INVENTION

The invention provides an improved low staple indicator for a stapler. In one embodiment, the indicator is not part of (i.e., is distinct from) the staple pusher assembly, but rather is a separate unit designed to accurately and reliably provide the user with notification visible from the top of the stapler. The indicator is cost effective, from both a part cost perspective and an assembly cost perspective.

More specifically, the invention provides a low staple indicator that can be used on virtually any stapler that utilizes strips of staples, stacked sheets of staples, or rolls of staples. A stapler embodying the invention includes a base, a staple storage chamber coupled to the base and housing a plurality of staples, and a low staple indicator assembly adjacent the staple storage chamber. In one embodiment, the low staple indicator includes an engaging portion configured to engage at least one of the plurality of staples housed in the staple storage chamber to position the low staple indicator assembly in a first position when there are a sufficient number of staples remaining in the staple storage chamber. The engaging portion of the low staple indicator assembly is further configured to disengage the staples housed in the staple storage chamber to position the low staple indicator assembly in a second position when the number of staples remaining in the staple storage chamber is getting low.

In one embodiment, the low staple indicator is used with a manual stapler having a base, a magazine movably coupled to the base, and a cover assembly movably coupled to the magazine. A staple pusher assembly is positioned within the magazine to bias a strip of staples within the magazine toward a staple driving end of the magazine. The low staple indicator includes a movable member distinct from the pusher assembly and that includes a mounting portion configured to mount the movable member above the strip of staples. A pawl arm is coupled to the mounting portion and includes a pawl configured to engage the strip of staples within the magazine when there are a sufficient number of staples remaining in the magazine. When the number of staples remaining in the magazine gets low, the pawl disengages the staples and drops below the level normally defined by the staples. This movement of the pawl moves the low staple indicator to a low staple notification position that will alert the user to the low staple condition of the stapler.

The indicator further includes a notification portion having a first indicator portion configured to indicate to the user that a sufficient number of staples remains in the stapler, and a second indicator portion configured to indicate to the user that the number of staples remaining in the stapler is getting low. The indicator portions are selectively visible through an opening in the top of the stapler's cover assembly. The indicator portions are coupled with the movable member so that when the pawl is supported by the staples, the first indicator portion is visible through the opening in the top of the cover assembly. When the pawl disengages from the staples, the movable member moves such that the second indicator portion becomes visible through the opening in the top of the cover assembly.

Other features and advantages of the invention will become apparent to those skilled in the art upon review of the following detailed description and drawings.

Figure 1:
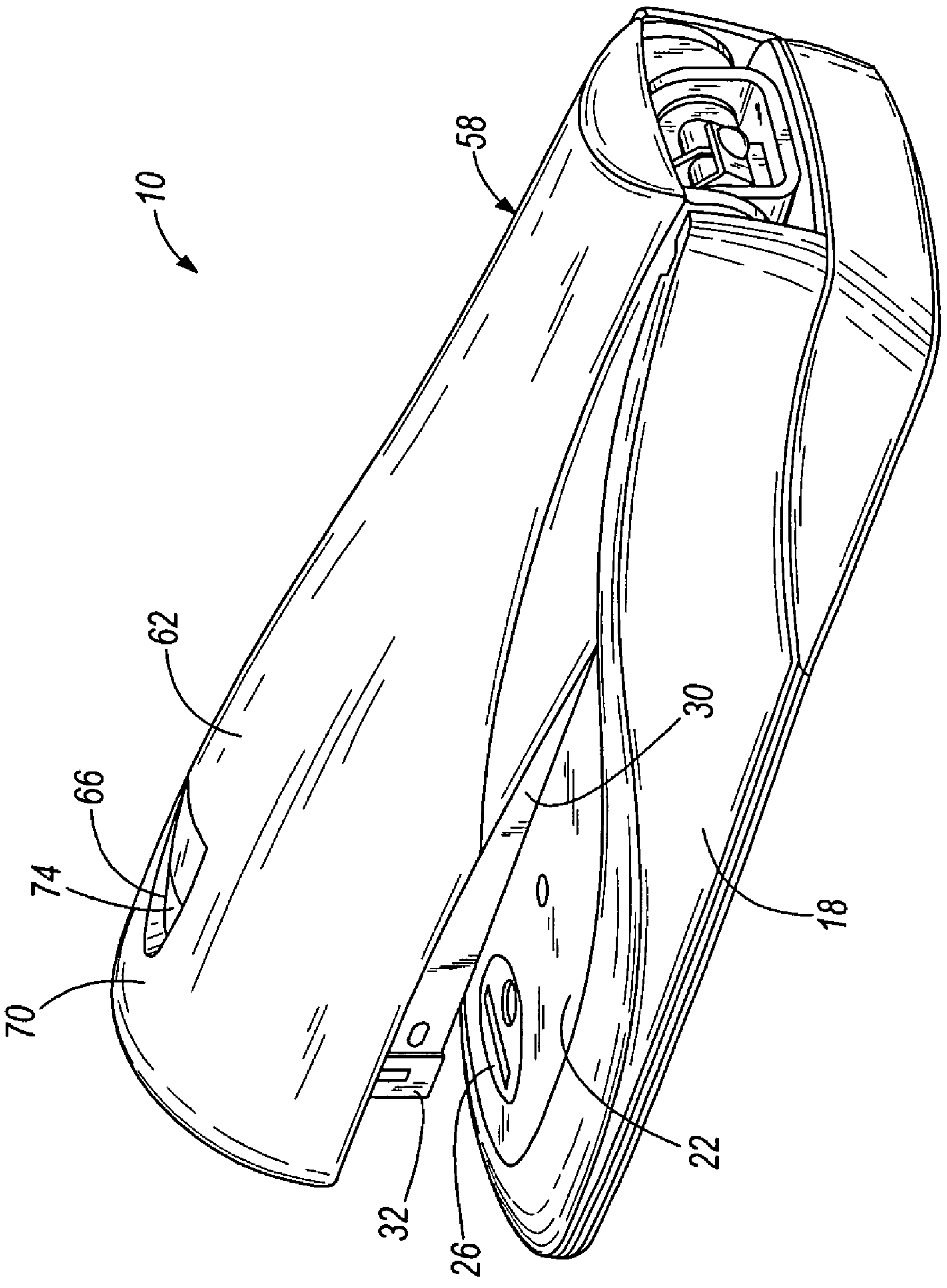
FIG. 1 is perspective view of a stapler embodying the invention.
Figure 2:
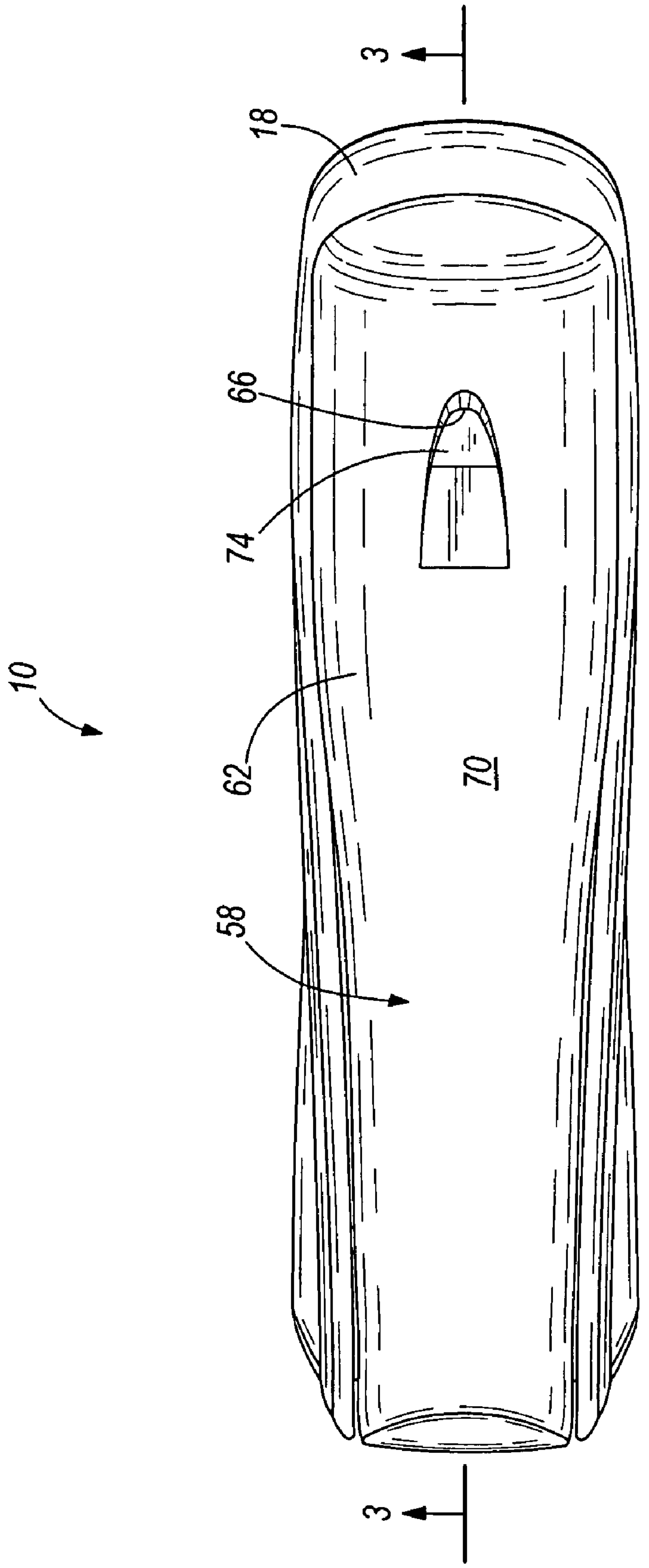
FIG. 2 is a top view of the stapler shown in FIG. 1.

Before one embodiment of the invention is explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein is for the purpose of description and should not be regarded as limiting. The use of "including", "having", and "comprising" and variations thereof herein is meant to encompass the items listed thereafter and equivalents thereof as well as additional items.

DETAILED DESCRIPTION

FIGS. 1-10 illustrate a stapler 10 embodying a low staple indicator assembly 14 of the present invention. It is to be understood that, while the illustrated stapler 10 is a manual, desktop-type stapler, the low staple indicator assembly 14 of the invention can be practiced with almost any type of stapler, including, but not limited to, manual hand-held or upright staplers, manual heavy-duty staplers, and all forms of electric staplers, including desktop-type, heavy-duty, and hand-held electric staplers. Additionally, while the low staple indicator assembly 14 of the invention is illustrated as being used with a stapler containing a strip of staples housed within a staple magazine, the low staple indicator assembly 14 of the invention can also be used with cartridge staplers that employ stacked or rolled sheets of staples.

Referring now to the illustrated embodiment, the stapler 10 includes a base 18 having an upper surface 22 configured to receive and support a stack of sheets 24 (see FIGS. 8 and 9) to be stapled. An anvil 26 is supported by the surface 22 for clinching staples driven through the stack of sheets. As used herein and in any appended claims, the terms “upper”, “lower”, “top”, “bottom”, “side”, “front”, “rear”, “forward”, “rearward”, and the like are for the purposes of description only, and are not intended to imply any required orientation of the stapler.

Figure 10:
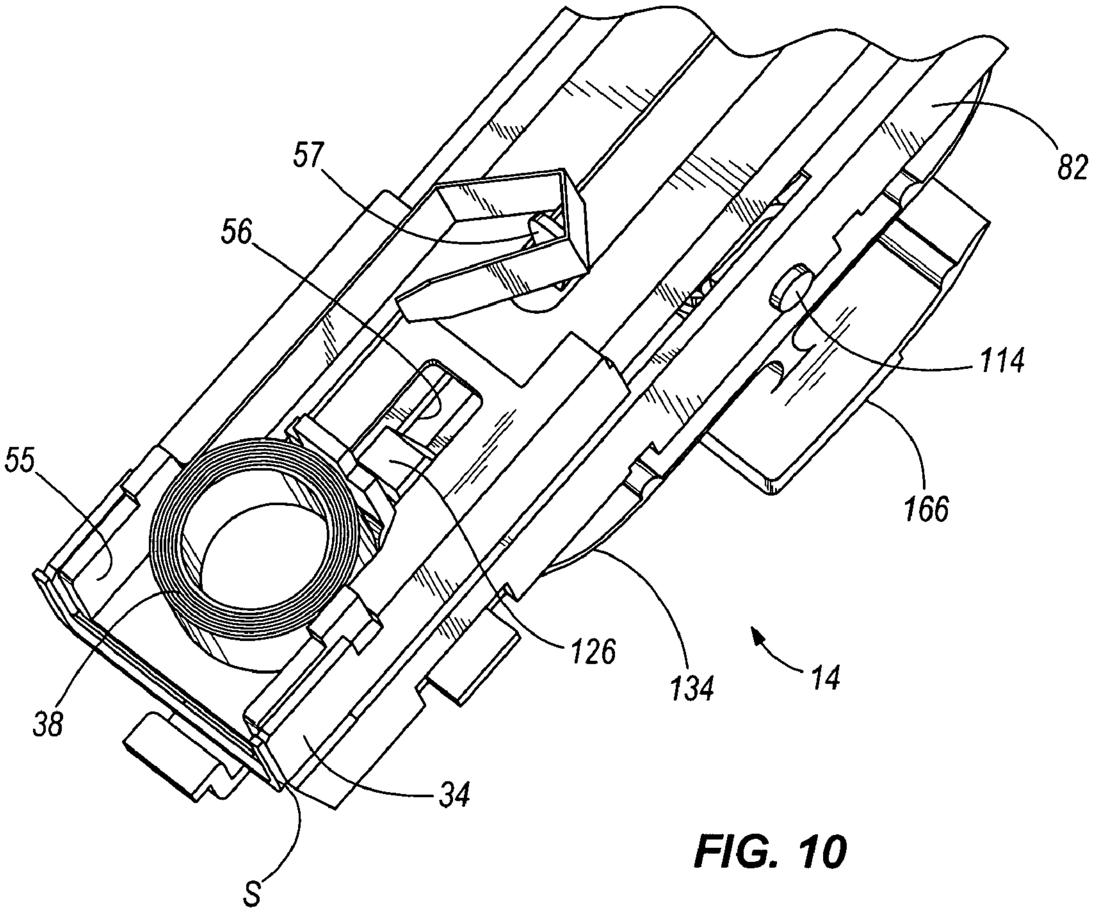
FIG. 10 is a partial perspective view showing the staple pusher spring housed underneath the rail of the stapler, and showing the low staple indicator assembly in the second orientation.

A staple storage chamber in the form of a staple magazine 30 is pivotally connected to the rear end of the base 18, as is understood in the art. The magazine 30 is configured to receive one or more strips of staples S, and includes a nose piece 32 coupled to the front end of the magazine 30 in a known manner. As shown in FIGS. 3, 4, 6, 7, and 10, a staple pusher 34 is positioned within the magazine 30 and is biased toward the front of the magazine 30 to urge the strip of staples S toward the staple ejection point. As shown in FIG. 10, and as will be described further below, the staple pusher 34 is biased forward by a constant force spring 38, but other biasing arrangements can also be used.

Figure 7:
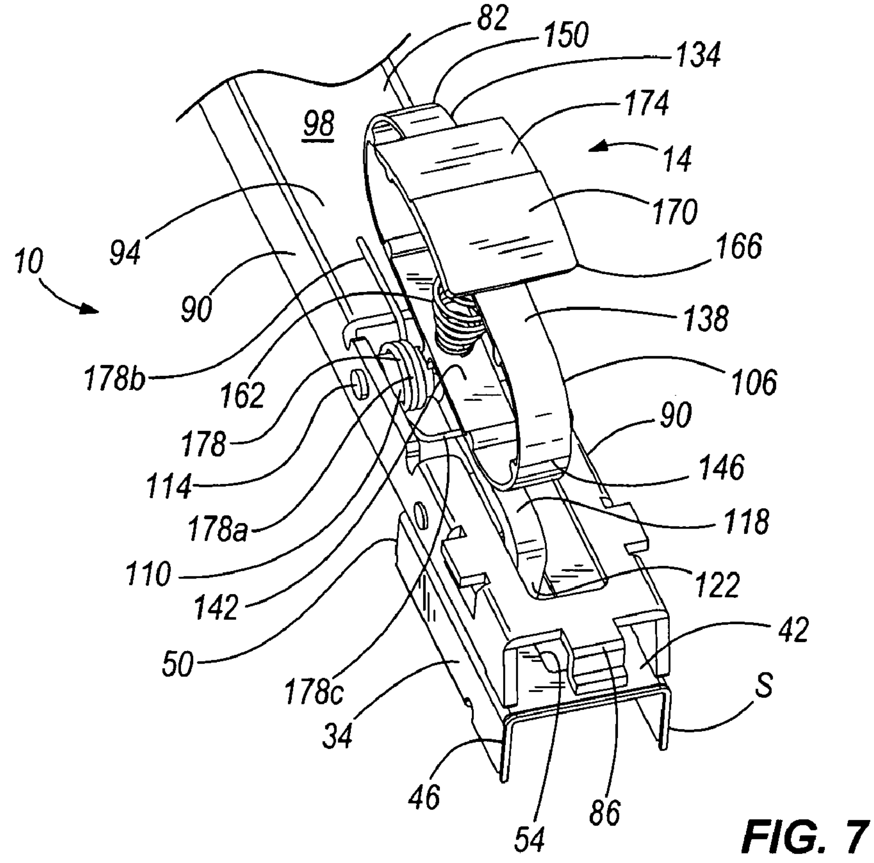
FIG. 7 is a partial perspective view illustrating the low staple indicator assembly in the second orientation, as shown in FIG. 4.

As shown in FIG. 7, the staple pusher 34 includes a top surface 42 defined between a leading end 46 and a trailing end 50 of the pusher 34. An elongated slot 54 is formed in the top surface 42. The magazine 30 also includes a rail 55 (see FIGS. 3, 4, and 10) that supports the underside of the staples S and the staple pusher 34. A top surface of the rail 55 also includes an elongated slot 56 that is generally aligned with the elongated slot 54 in the pusher 34. As best illustrated in FIG. 10, the constant force spring 38 is housed on the underside of the rail 55, and one end of the spring 38 is hooked around a downward facing tab 57 of the staple pusher 34 that extends through the slot 56. Note that portions of the spring 38 have been removed in FIGS. 3, 4, 8, and 9 for clarity. The rail 55 retains the coiled portion of the constant force spring 38 and prevents the spring 38 from interfering with the strip of staples S as the spring 38 extends and recoils with movement of the staple pusher 34. If an alternative spring arrangement is used to bias the staple pusher 34, the rail 55 could be eliminated from within the magazine 30, as magazines without rails are well-known.

A cover assembly 58 is also pivotally connected to the base 18, and is capable of pivoting both with the magazine 30 and with respect to the magazine 30 during stapling operations. The cover assembly 58 also pivots away from the magazine 30 to facilitate re-filling the magazine 30 with strips of staples S.

The cover assembly 58 includes an outer cover 62 that can be depressed by the user to actuate the stapler 10. As shown in FIGS. 1-4, the outer cover 62 includes a window or cutout 66 formed in a top surface 70 of the outer cover 62. A translucent lens 74 can be positioned in or adjacent the cutout 66 to prevent debris from entering the cover assembly 58. A staple driver 76 is secured to the underside of the outer cover 62 so that when the cover assembly 58 is closed, the staple driver 76 is positioned directly above the staple ejection point defined by the front of the magazine 30. The staple driver 76 includes a slot 78.

Referring now to FIGS. 3-7, the cover assembly 58 further includes a case 82 that is pivotally connected to the base 18. The case 82 at least partially closes the upper portion of the magazine 30 when the cover assembly 58 is in the closed position, and pivots with the outer cover 62 to the open position for re-filling the magazine 30 with staples S. The case 82 is also pivotable with respect to the outer cover 62 during stapling, such that the outer cover 62 and the staple driver 76 can move in a staple driving direction (downwardly) relative to the case 82. A projection 86 at the front end of the case 82 is received in the slot 78 of the staple driver 76 to facilitate the relative movement between the staple driver 76 and the case 82.

Figure 4:
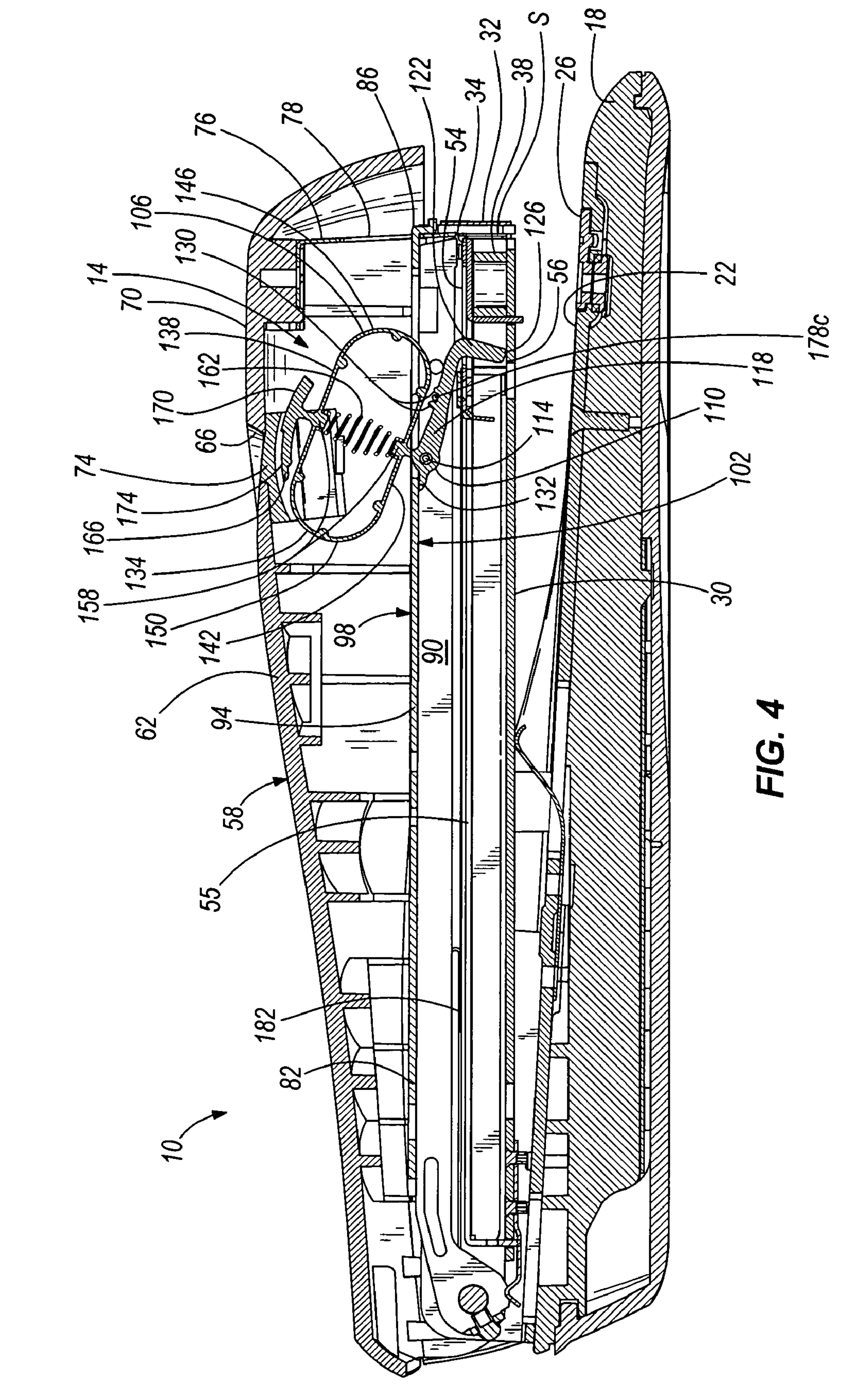
FIG. 4 is a section view similar to FIG. 3, illustrating the low staple indicator assembly in a second orientation indicating that the number of staples in the stapler is low.
Figure 5:
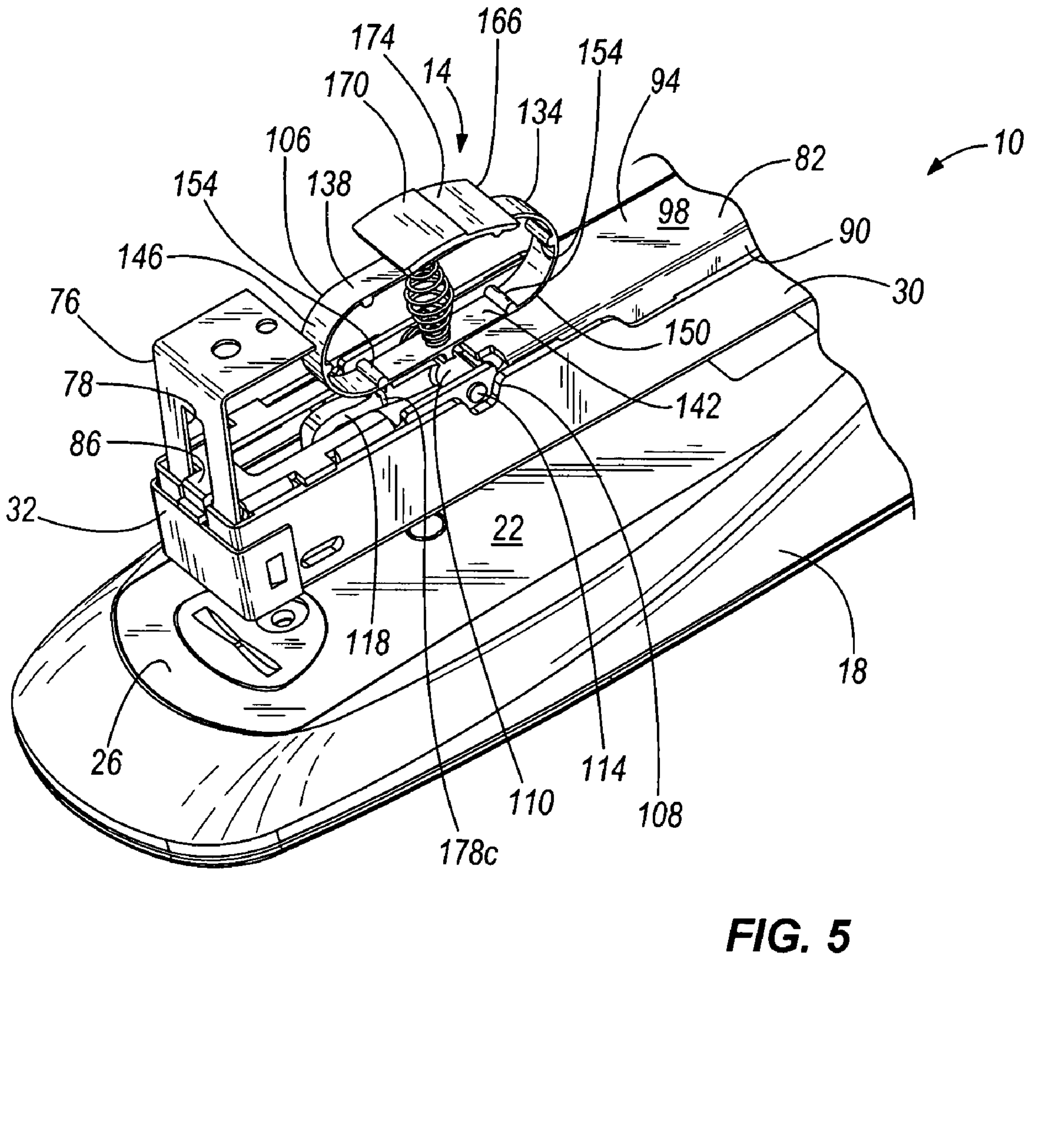
FIG. 5 is partial perspective view of the low staple indicator assembly in the stapler, shown with the cover of the stapler removed.
Figure 6:
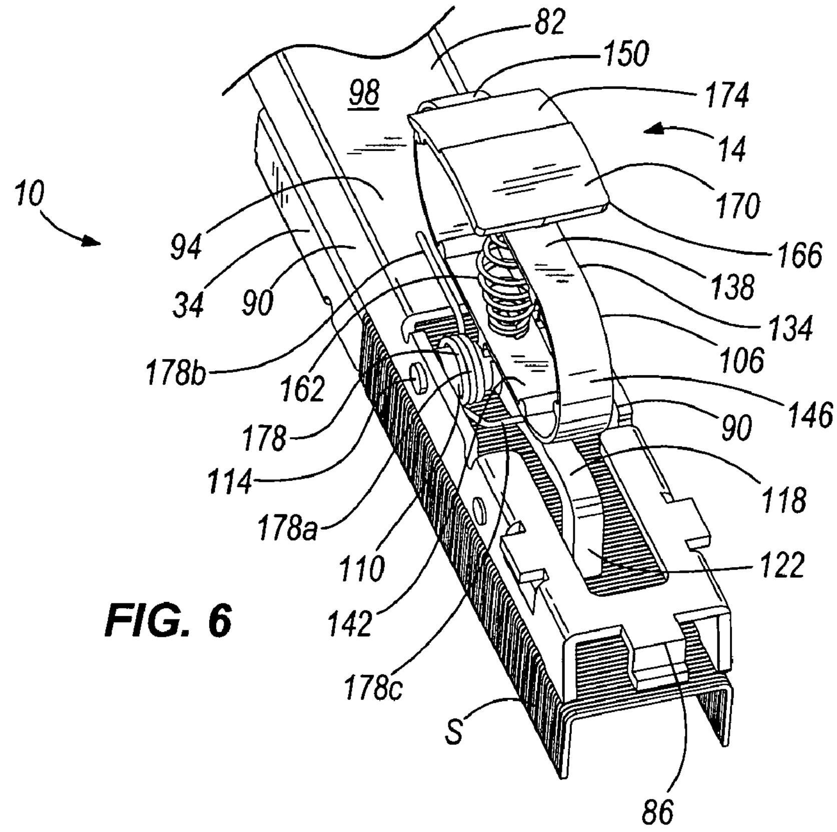
FIG. 6 is a partial perspective view illustrating the low staple indicator assembly in the first orientation, as shown in FIG. 3.

As best seen in FIGS. 5-7, the case 82 includes spaced-apart sidewalls 90 and a top wall 94 extending at least partially between the sidewalls 90. The top wall 94 includes an upper surface 98 and a lower surface 102 (see FIGS. 3 and 4). A portion of the top wall 94 is open to receive the low staple indicator assembly 14.

The low staple indicator assembly 14 is positioned above the strip of staples S in the magazine 30 and is coupled to the cover assembly 58. More specifically, the low staple indicator assembly 14 is positioned at least partially between the outer cover 62 and the case 82. The structure of the low staple indicator assembly 14 will be described first, and the operation and interaction of the low staple indicator assembly 14 with the remainder of the stapler 10 will be subsequently discussed in detail.

In the illustrated embodiment, the low staple indicator assembly 14 includes a movable member 106 having a mounting portion 110 movably mounted between the sidewalls 90 of the case 82. Specifically, the mounting portion 110 receives two mounting pins 114 that are supported in apertures formed in the sidewalls 90 of the case 82. Therefore, the movable member 106 is pivotal or rotatable relative to the sidewalls 90 of the case 82. The sidewalls of the magazine 30 include notched portions 108 (see FIG. 5—only one notched portion is shown) that provide clearance for the mounting pins 114.

The movable member 106 further includes a pawl arm 118 extending from the mounting portion 110 toward the front end of the magazine 30. The pawl arm 118 terminates in a downwardly extending pawl 122 that includes a lower engagement surface 126 (see FIGS. 3, 4, and 10).

The movable member 106 additionally includes a body portion 134 coupled to the mounting portion 110. The body portion 134 is illustrated as being generally oval-shaped, but could also have different geometries. In the illustrated embodiment, the body portion 134 includes upper and lower straight segments 138 and 142, respectively, and front and rear curved segments 146 and 150, respectively. A plurality of ribs 154 (see FIG. 5) are positioned around the inner surface of the body portion 134 and add strength and rigidity to the oval-shaped geometry of the body portion 134.

The body portion 134 also includes spring mounts 158 (see FIGS. 3 and 4) formed on the upper and lower straight segments 138, 142 and generally in line with the mounting portion 110. The spring mounts 158 receive a compression spring 162 that helps to ensure the resiliency of the oval-shaped body portion 134 over the life of the stapler 10. It should be noted that the use of the compression spring 162 is optional and could be eliminated depending on the construction of the body portion 134.

A notification portion 166 of the movable member 106 is coupled to the upper straight segment 138 of the body portion 134. The notification portion 166 includes first and second indicator portions 170 and 174, respectively. The first indicator portion 170 is on the front end of the notification portion 166 and includes indicia, coloring, or any other suitable notification means to inform a user that the stapler 10 contains a sufficient amount of staples. In the illustrated embodiment, the first indicator portion 170 is colored green to signify that the stapler 10 contains a sufficient amount of staples for continued stapling. The green coloring is achieved by using green colored plastic for the notification portion 166, but could also be achieved by printing or otherwise applying a green coloring to the first indicator portion 170.

The second indicator portion 174 is on the rear end of the notification portion 166 and includes indicia, coloring, or any other suitable notification means to inform a user that the number of staples S in the stapler 10 is getting low. In the illustrated embodiment, the second indicator portion 174 is colored red to signify that the number of staples in the stapler 10 is getting low and that the magazine 30 will need to be re-filled either soon or immediately for continued stapling. The red coloring is achieved through the application of a red pressure-sensitive label on the second indicator portion 174, but could also be achieved by printing or otherwise applying a red coloring to the second indicator portion 174.

The first and second indicator portions 170 and 174 are spaced along a generally arcuate and stepped surface of the notification portion 166. In the illustrated embodiment, the step in the notification portion 166 defines the border between the first and second indicator portions 170, 174 and facilitates application of the red pressure-sensitive label by providing an alignment guide or edge for applying the label. Depending on the orientation of the movable member 106, either the first indicator portion 170 or the second indicator portion 174 will be positioned closer to the underside of the outer cover 62, and more specifically, closer to the cutout 66 formed in the outer cover 62.

In the illustrated embodiment, the movable member 106 is a polymer part that can be molded or formed through other suitable processes. While the notification portion 166, the body portion 134, and the mounting portion 110 are illustrated as being integrally formed as the movable member 106, one or more of these portions can alternatively be separate components connected together. The mounting pins 114 can be integrally formed with the remainder of the mounting portion 110, or as illustrated, can be separately inserted or insert-molded metal pins. A single mounting shaft could also be used. The optional compression spring 162 is also illustrated as being a separate component. Of course, any suitable plastic or metallic materials can be used to form the movable member 106.

When the movable member 106 is mounted between the sidewalls 90 of the case 82 as described above, a torsion spring 178 (see FIGS. 6 and 7) is coupled to the movable member 106 to bias the movable member 106 toward a forward-pivoted orientation. Specifically, a coil portion 178*a* of the torsion spring 178 is supported by the mounting portion 110, while a rearwardly-extending leg portion 178*b* of the torsion spring 178 rests against the upper surface 98 of the top wall 94 of the case 82. A forwardly-extending leg portion 178*c* of the torsion spring 178 includes a 90° bend that hooks over the top of the pawl arm 118 to retain its position on the top of the pawl arm 118 (see FIGS. 3-5), thereby biasing the pawl arm 118 downwardly to urge the movable member 106 toward the forward-pivoted orientation. Two ribs 130 on the top of the pawl arm further retain the leg portion 178*c* in position on the pawl arm 118. However, the ribs 130 are optional and could be eliminated.

As best seen in FIG. 4, a rib 132 that extends rearwardly from the mounting portion 110 operates to limit the rotation of the movable member 106 toward the forward-pivoted orientation. Specifically, when the rib 132 engages the lower surface 102 of the top wall 94 of the case 82, the movable member 106 cannot rotate any further toward the forward-pivoted orientation.

Figure 3:
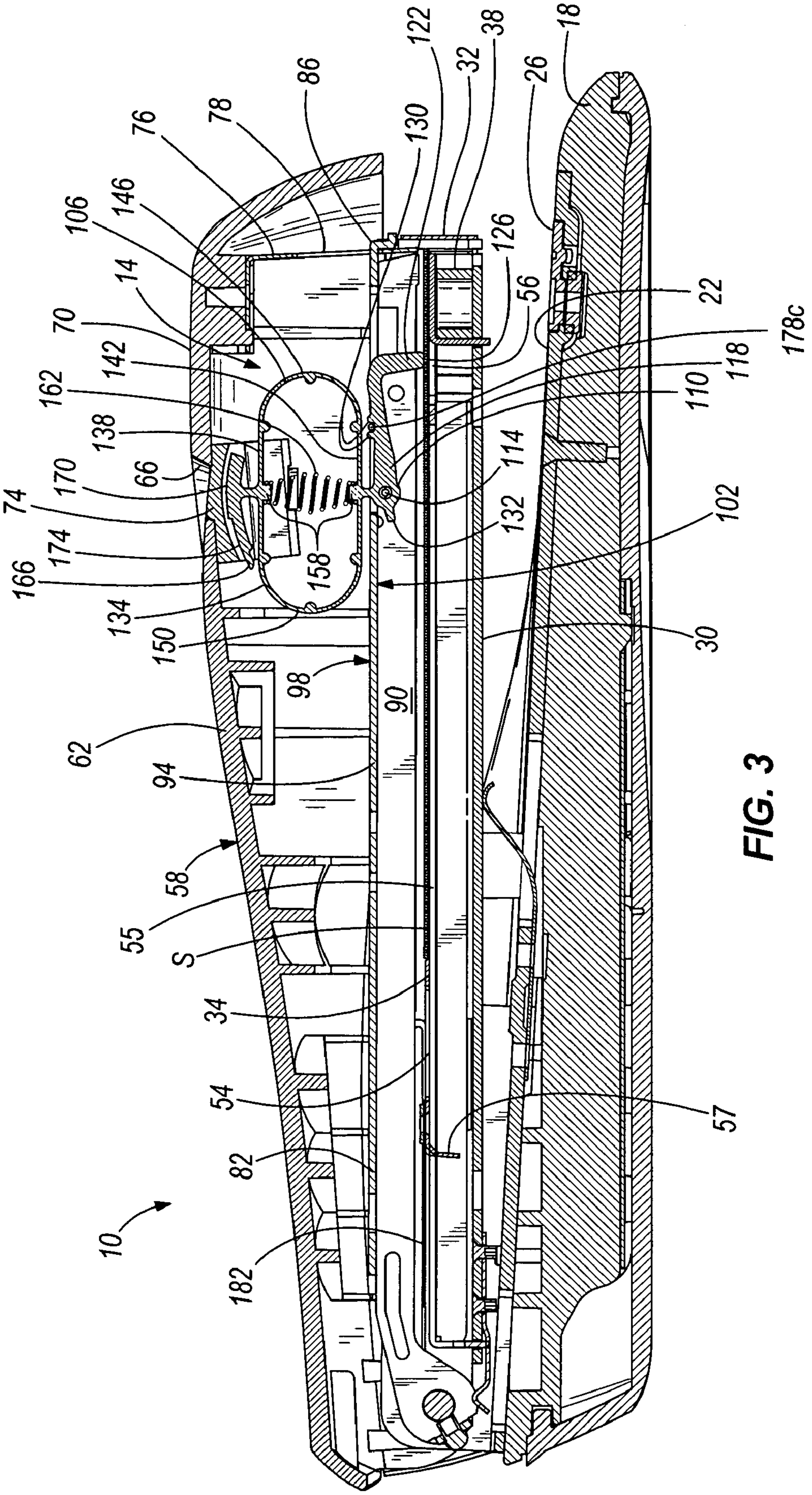
FIG. 3 is a section view taken along line 3-3 of FIG. 2, illustrating a low staple indicator assembly in a first orientation indicating a sufficient number of staples remaining in the stapler.

The operation of the low staple indicator assembly 14 will now be described. FIGS. 3 and 6 illustrate a first position of the low staple indicator assembly 14, when there are a sufficient number of staples S in the magazine 30. The lower engagement surface 126 of the pawl 122 is biased into engagement with and rests on top of the strip of staples S in the magazine 30. The engagement between the pawl 122 and the staples S prevents the movable member 106 from pivoting forward any more. In this first position, the first indicator portion 170 is positioned directly underneath the cutout 66 in the outer cover 62 such that a user sees the green coloring on the first indicator portion 170 through the cutout 66 and the lens 74. In observing the green coloring of the first indicator portion 170, the user is notified that there are a sufficient number of staples S remaining in the magazine 30 for continued stapling.

Figure 8:
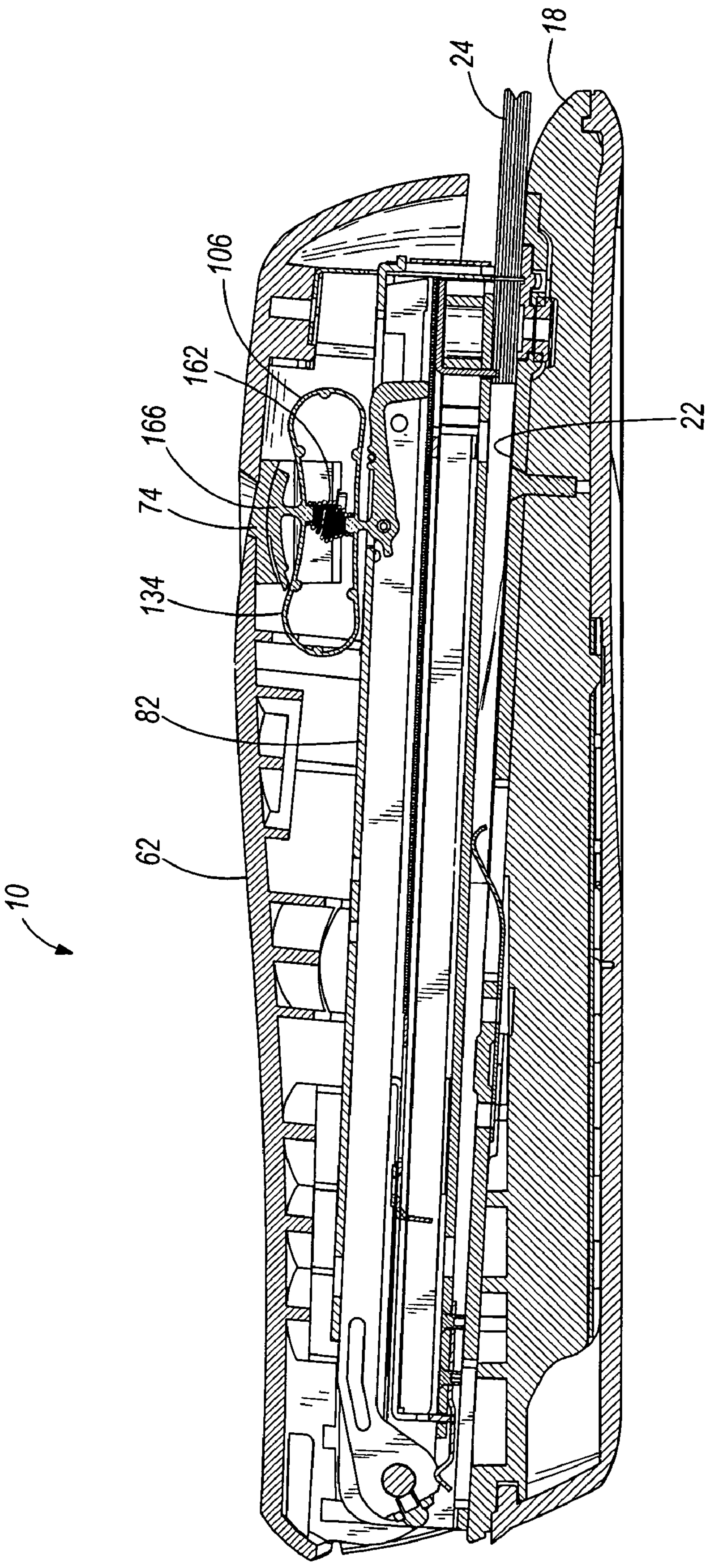
FIG. 8 is a section view similar to FIG. 3 showing the low staple indicator assembly in the first orientation during a stapling operation.

With reference to FIG. 8, as the user depresses the outer cover 62 to actuate stapling, the oval-shaped body portion 134 is compressed and deformed between the outer cover 62 and the case 82. Specifically, the underside of the lens 74 engages the notification portion 166 and pushes the notification portion 166 downwardly, thereby deforming the body portion 134. When the user releases the outer cover 62 after stapling, the cover 62 moves upwardly and the body portion 134 returns to its original oval-shape, either due to its geometry alone, and/or with assistance from the optional compression spring 162. This sequence of compressions and subsequent restorations to the original state of the body portion 134 repeatedly occurs with each stapling action that takes place when the movable member 106 is in the first position.

As continued stapling occurs, the pusher 34 continuously urges the strip of staples S forward in the magazine 30, and the lower engagement surface 126 of the pawl 122 remains supported by the forward-moving staples S. When the rearward-most staple S in the magazine 30 passes by the lower engagement surface 126 of the pawl 122, the lower engagement surface 126 is supported for a few more stapling cycles by the top surface 42 of the pusher 34 adjacent the leading end 46.

As stapling continues, the pusher 34 will eventually move forward within the magazine 30 to a point where the lower engagement surface 126 of the pawl 122 will encounter the elongated slot 54 in the top surface 42 of the pusher 34. When this occurs, the pawl 122 is no longer supported by the staples S or the top surface 42 of the pusher 34 and will fall into the slot 54 in the pusher 34 and into the slot 56 in the underlying rail 55 due to the biasing force of the torsion spring 178, thereby allowing the movable member 106 to pivot forward to a second position. Of course, it should be understood that the slot 54 in the pusher 34 could extend all the way to the leading end 46 of the pusher 34 such that the pawl 122 will fall into the slot 54 immediately upon disengagement with the last staple S in the strip.

FIGS. 4, 7, 9, and 10 show the low staple indicator assembly 14 in the second position. In the illustrated embodiment, the low staple indicator assembly 14 moves to the second position when the number of staples S in the magazine 30 drops below about twenty staples S. Of course, the low staple indicator assembly 14 can be sized and/or positioned to move to the second or low staple notification position with any desired number of remaining staples. For example, the apertures in the case 82 for receiving the mounting pins 114 could be moved forward or rearward to change the location of the pawl 122. Alternatively, the length of the pawl arm 118 could be shortened or lengthened.

When the movable member 106 is pivoted to this second position, the second indicator portion 174 is positioned directly underneath the cutout 66 in the outer cover 62 such that a user sees the red coloring on the second indicator portion 174 through the cutout 66 and the lens 74. In observing the red coloring of the second indicator portion 174, the user is alerted to the fact that the number of staples S in the magazine 30 is getting low, or that the magazine 30 is empty. This enables the user to take action to refill the magazine 30 for continued stapling.

Figure 9:
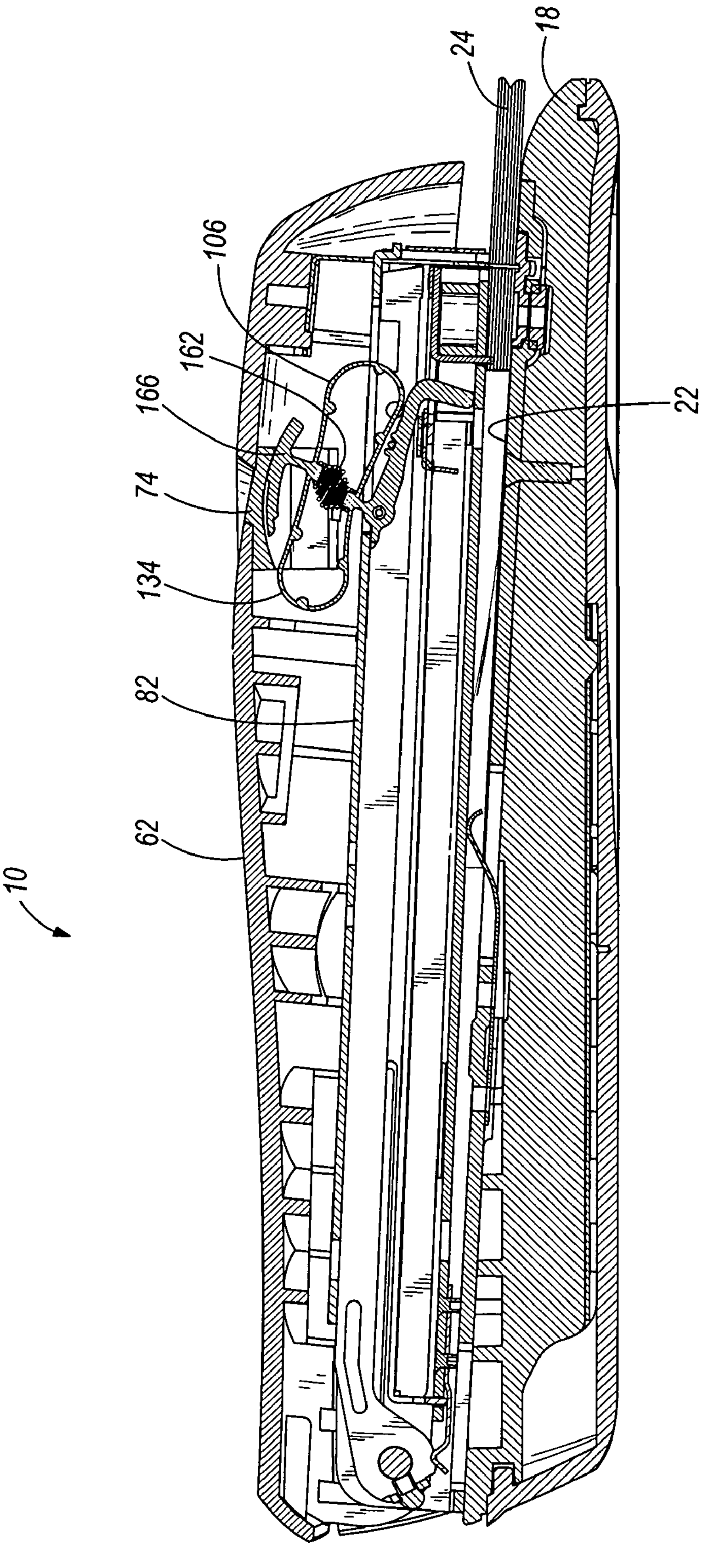
FIG. 9 is a section view similar to FIG. 4 showing the low staple indicator assembly in the second orientation during a stapling operation.

FIG. 9 illustrates the deformation of the body portion 134 that occurs during stapling operations when the movable member 106 is pivoted to the second position. As the user depresses the cover 62, the curved underside of the lens 74 engages the arcuate notification portion 166 to apply force generally coaxially with the optional compression spring 162, thereby compressing and deforming the body portion 134. When the user releases the outer cover 62 after stapling, the cover 62 moves upwardly and the body portion 134 returns to its original oval-shape, either due to its geometry alone, and/or with assistance from the optional compression spring 162. This sequence of compressions and subsequent restorations to the original state of the body portion 134 repeatedly occurs with each stapling action that takes place when the movable member 106 is in the second position.

To refill the magazine 30, the user opens the cover assembly 58. The low staple indicator assembly 14, which is coupled to the case 82, will be pivoted with the case 82 away from the magazine 30 so that the user can insert one or more strips of staples S into the magazine. Typically, opening the cover assembly 58 automatically moves the pusher 34 to the rear end of the magazine 30 to facilitate insertion of staples S. In the illustrated embodiment, a pull-back strap 182 (see FIGS. 3 and 4) is connected between the staple pusher 34 and the case 82 to move the pusher 34 to the rear of the magazine 30 when the cover assembly 58 is opened. Once the staples S are inserted into the magazine 30, the user closes the cover assembly 58, thereby returning the case 82 and the low staple indicator assembly 14 to the position shown in FIG. 3. Due to the sufficient number of staples in the magazine 30, the lower engagement surface 126 of the pawl 122 will again be supported on top of the staples S such that the movable member 106 is oriented in the first position.

The low staple indicator assembly 14 could also be modified to include more than two indicator portions 170, 174 to provide even further graduated notification to the user. For example, a third indicator portion could be added between the illustrated first and second indicator portions 170 and 174, and could be colored yellow to indicate a remaining supply of staples somewhere between generally full and generally low. Instead of either being supported by the staples S or falling through the slots 54, 56, the engaging surface 126 of the pawl 122 could encounter an intermediate surface that would position this third indicator portion beneath the lens 74 and the cutout 66.

In another example, the engaging surface 126 of the pawl 122 could move along a sloped or ramped surface to impart a more gradual rotation or pivoting of the movable member 106. As mentioned above, other methods for providing notifying indicia on the notification portion 166 could be used, such as graduated markings, markings like those known for use on fuel gauges (e.g., F-¾-½-¼-E), or any other suitable markings.

Those skilled in the art will understand that the low staple indicator assembly 14 can also be used in its illustrated form, or in a modified form, in staplers having different staple storage chambers (e.g., cartridge-type staplers). For example, the pawl 122 could engage a top sheet of a stacked sheet of staples within a staple cartridge. As the staple sheets are used, and the stack diminishes in height, the pawl would move downwardly with the diminishing stack, causing the movable member 106 and the notification portion 166 to move toward a low staple notification position.

In another example, the low staple indicator assembly 14 could be positioned adjacent a cartridge containing a rolled sheet of staples. The pawl 122 could engage the sheet of staples exiting the cartridge such that when the last staple in the sheet passes the pawl, the pawl would disengage the sheet of staples and move downwardly, thereby moving the low staple indicator assembly to a low staple notification position.

Various features of the invention are set forth in the following claims.

The invention claimed is:

1. A method of indicating a supply of staples within a stapler having a staple storage chamber and a staple pusher assembly biasing staples within the staple storage chamber, the method comprising:

providing a low staple indicator distinct from the staple pusher assembly;

engaging a portion of the low staple indicator with at least one of a staple and the staple pusher assembly in the staple storage chamber to maintain the low staple indicator in a first position indicating a sufficient supply of staples in the staple storage chamber;

performing stapling operations with the stapler until the supply of staples in the staple storage chamber diminishes and the portion of the low staple indicator no longer engages at least one of a staple and the staple pusher assembly in the staple storage chamber; and after disengagement of the portion of the low staple indicator from at least one of a staple and the staple pusher assembly within the staple storage chamber, automatically moving the low staple indicator to a second position indicating a diminished supply of staples in the staple storage chamber.

2. The method of claim 1, further comprising resiliently deforming the low staple indicator while performing stapling operations.

3. The method of claim 1, wherein automatically moving the low staple indicator to the second position includes pivoting the low staple indicator.

4. A stapler comprising:

a base, a staple storage chamber coupled with the base;

a cover at least partially covering the staple storage chamber, wherein the cover is movable relative to the staple storage chamber generally in a first direction during a stapling operation; and a low staple indicator device positioned between the staple storage chamber and the cover, and wherein at least a portion of the low staple indicator device is resiliently deformed generally in the first direction during a stapling operation.

5. The stapler of claim 4, wherein the cover includes an aperture, and wherein the low staple indicator device includes an indicator portion visible through the aperture.

6. The stapler of claim 4, wherein the low staple indicator includes a resilient body portion that deforms during a stapling operation.

7. The stapler of claim 6, wherein the resilient body portion is generally oval in shape.

8. The stapler of claim 6, wherein the low staple indicator device includes a spring coupled with the resilient body portion to facilitate returning the deformed body portion to the un-deformed state.

9. A stapler comprising:

a base, a staple storage chamber coupled with the base;

a staple pusher assembly positioned at least partially in the staple storage chamber, the staple pusher assembly including a staple pusher and a biasing member urging the staple pusher in a first direction; and a low staple indicator distinct from the staple pusher assembly and movable between a first position indicating the presence of a staple at a location in the staple storage chamber and a second position indicating the absence of a staple at the location in the storage chamber wherein the low staple indicator includes a portion that engages one of a staple and the staple pusher at the location in the staple storage chamber when the low staple indicator is in the first position.

10. The stapler of claim 9, further including a cover at least partially covering the staple storage chamber, and wherein an indicator portion of the low staple indicator is visible through the cover.

11. The stapler of claim 10, wherein the cover is movable relative to the staple storage chamber during a stapling operation.

12. The stapler of claim 10, wherein the low staple indicator is positioned between the staple storage chamber and the cover, and wherein at least a portion of the low staple indicator is resiliently deformed during a stapling operation.

13. The stapler of claim 10, wherein the cover includes an aperture through which the indicator portion can be viewed.

14. The stapler of claim 13, wherein the aperture is in a top surface of the cover.

15. The stapler of claim 9, wherein the staple pusher has an aperture formed therein, and wherein the low staple indicator includes a portion that is received in the aperture in the staple pusher when the low staple indicator is in the second position.

16. The stapler of claim 9, wherein the portion of the low staple indicator does not engage one of a staple and the staple pusher at the location in the staple storage chamber when the low staple indicator is in the second position.

17. The stapler of claim 9, wherein the low staple indicator is pivotably mounted within the stapler to pivot between the first and second positions.

18. The stapler of claim 9, wherein the low staple indicator is biased toward the second position.

19. The stapler of claim 18, wherein the low staple indicator is maintained in the first position, overcoming the bias toward the second position, due to engagement between the portion of the low staple indicator with one of a staple and the staple pusher at the location in the staple storage chamber.

* * * * *